(12) United States Patent
Shinohara

(10) Patent No.: US 10,185,123 B2
(45) Date of Patent: Jan. 22, 2019

(54) LENS SYSTEM

(71) Applicant: Apple Inc., Cupertino, CA (US)

(72) Inventor: Yoshikazu Shinohara, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 69 days.

(21) Appl. No.: 15/285,898

(22) Filed: Oct. 5, 2016

(65) Prior Publication Data

US 2017/0115471 A1    Apr. 27, 2017

Related U.S. Application Data

(60) Provisional application No. 62/245,196, filed on Oct. 22, 2015.

(51) Int. Cl.
*G02B 3/02*    (2006.01)
*G02B 13/18*    (2006.01)
(Continued)

(52) U.S. Cl.
CPC .......... *G02B 13/0045* (2013.01); *G02B 9/62* (2013.01); *G02B 13/02* (2013.01);
(Continued)

(58) Field of Classification Search
CPC ...... G02B 13/0045; G02B 13/13; G02B 9/62; G02B 27/0025
(Continued)

(56) References Cited

U.S. PATENT DOCUMENTS 4,659,187 A * 4/1987 Tsuji .................... G02B 15/173
                                                        359/688
8,385,006 B2 * 2/2013 Tsai ....................... G02B 13/18
                                                        359/708
(Continued)

FOREIGN PATENT DOCUMENTS

CN         102967922        3/2013
CN         104597586        5/2015
KR     10-2015-0059212       6/2015

OTHER PUBLICATIONS

Evaluation Report from Chinese Patent No. ZL2016211436894, Apple Inc., dated May 18, 2017, pp. 1-14, Chinese version and English translation.
(Continued)

*Primary Examiner* — William R Alexander
*Assistant Examiner* — Tamara Y Washington
(74) *Attorney, Agent, or Firm* — Robert C. Kowert; Meyertons, Hood, Kivlin, Kowert & Goetzel, P.C.

(57) ABSTRACT

Compact narrow angle lens systems that may be used in small form factor cameras. The lens system may include six lens elements with refractive power, and may provide lower F-numbers while maintaining or improving imaging quality and package size when compared to other compact lens systems. Total track length of the lens system may be 6.5 millimeters or less, for example 5.9 or 6 millimeters. Focal length of the lens system may be 7.0 millimeters or less, for example 6.6 millimeters. The lens system may include an aperture stop located behind the front vertex of the lens system, for example between the first and second lens elements, that effectively moves the ideal principal point of the camera to in front of the front vertex. The lens system may provide a focal ratio of 2.8 or less, for example 2.6 or 2.4.

19 Claims, 7 Drawing Sheets

(51) Int. Cl.
*G02B 13/00* (2006.01)
*G02B 9/62* (2006.01)
*G02B 13/02* (2006.01)
*G02B 27/00* (2006.01)
*G02B 5/00* (2006.01)
*G02B 5/20* (2006.01)

(52) U.S. Cl.
CPC .......... *G02B 27/0025* (2013.01); *G02B 5/005* (2013.01); *G02B 5/208* (2013.01)

(58) Field of Classification Search
USPC ............... 359/641, 648, 650, 672–706, 719, 359/712–716
See application file for complete search history.

(56) References Cited

U.S. PATENT DOCUMENTS

| | | | |
|---|---|---|---|
| 8,861,095 B2 | 10/2014 | Kubota et al. | |
| 8,891,183 B2 | 11/2014 | Tsai et al. | |
| 9,217,848 B1 | 12/2015 | Chen et al. | |
| 9,606,323 B2 | 3/2017 | Shin et al. | |
| 9,759,893 B2 * | 9/2017 | Jo | G02B 13/0045 |
| 2013/0010181 A1 * | 1/2013 | Baba | G02B 13/0035 348/360 |
| 2014/0240469 A1 * | 8/2014 | Lee | H04N 13/025 348/48 |
| 2014/0293453 A1 * | 10/2014 | Ogino | G02B 13/0045 359/714 |
| 2014/0355134 A1 * | 12/2014 | Sekine | G02B 13/0045 359/713 |
| 2015/0042862 A1 * | 2/2015 | Huang | H04N 5/2254 348/335 |
| 2015/0116569 A1 | 4/2015 | Mercado | |
| 2015/0138431 A1 | 5/2015 | Shin et al. | |
| 2016/0109688 A1 | 4/2016 | Jo | |
| 2016/0320592 A1 * | 11/2016 | Huang | G02B 13/0045 |
| 2016/0341934 A1 * | 11/2016 | Mercado | G02B 9/62 |
| 2017/0108665 A1 * | 4/2017 | Huang | G02B 13/0045 |

OTHER PUBLICATIONS

Office Action from Korean Patent Application No. 20-2016-0006117, dated Jan. 15, 2018, Korean version and English Translation, Apple Inc., pp. 1-13.

* cited by examiner

LENS SYSTEM

PRIORITY INFORMATION

This application claims benefit of priority of U.S. Provisional Application Ser. No. 62/245,196 entitled "LENS SYSTEM" filed Oct. 22, 2015, the content of which is incorporated by reference herein in its entirety.

BACKGROUND

Technical Field

This disclosure relates generally to camera systems, and more specifically to high-resolution, small form factor camera systems and lens systems.

Description of the Related Art

The advent of small, mobile multipurpose devices such as smartphones and tablet or pad devices has resulted in a need for high-resolution, small form factor cameras for integration in the devices. However, due to limitations of conventional camera technology, conventional small cameras used in such devices tend to capture images at lower resolutions and/or with lower image quality than can be achieved with larger, higher quality cameras. Achieving higher resolution with small package size cameras generally requires use of a photosensor with small pixel size and a good, compact imaging lens system. Advances in technology have achieved reduction of the pixel size in photosensors. However, as photosensors become more compact and powerful, demand for compact imaging lens system with improved imaging quality performance has increased.

SUMMARY OF EMBODIMENTS

Embodiments of the present disclosure may provide a high-resolution narrow angle camera in a small package size. A camera is described that includes a photosensor and a compact lens system. Embodiments of a compact lens system with six lens elements are described that may provide a larger image and with longer effective focal length than has been realized in conventional small form factor cameras. Embodiments of the camera may be implemented in a small package size while still capturing sharp, high-resolution images, making embodiments of the camera suitable for use in small and/or mobile multipurpose devices such as cell phones, smartphones, pad or tablet computing devices, laptop, netbook, notebook, subnotebook, and ultrabook computers. In some embodiments, a narrow-angle camera as described herein may be included in a device along with one or more other cameras such as a conventional, wider-field small format camera, which would for example allow the user to select between the different camera formats (e.g., telephoto or wide-field) when capturing images with the device. In some embodiments, two or more narrow-angle cameras as described herein may be included in a device, for example as front-facing and rear-facing cameras in a mobile device.

In some embodiments, the narrow angle lens system may be a fixed lens system configured such that the effective focal length f of the lens system of 7 millimeters (mm) or less (e.g., within a range of 6.0-7.0 mm), the F-number (focal ratio) is 2.8 mm or less (e.g., within a range from about 2.2 to about 2.8), and the total track length (TTL) of the lens system is 6.5 mm or less (e.g., within a range of about 5.5 to about 6.5 mm). In the example embodiments described herein, the lens system may be configured such that the effective focal length f of the lens system is at or about 6.6, and the F-number is at or about 2.4 or 2.6. However, note that the focal length and/or other lens system parameters may be scaled or adjusted to meet specifications of optical, imaging, and/or packaging constraints for other camera system applications.

In some embodiments, the location of the aperture stop may be moved behind the front vertex of the lens system, for example behind the front vertex at the first lens element or between the first and second lens elements. Moving the aperture stop inwards (towards the image side) effectively moves the ideal principal point of the camera forwards, to the object side and in front of the front vertex of the lens system.

In some embodiments, the narrow angle lens system may be adjustable. For example, the lens system may be equipped with an adjustable iris or aperture stop. Using an adjustable aperture stop, the F-number may be dynamically varied within some range, for example within the range of 2.2 to 10. In some embodiments, the lens system may be used at faster focal ratios (<2.4), possibly with degraded imaging quality performance, at the same field of view (FOV, e.g. 36 degrees), or with reasonably good performance at a smaller FOV.

The refractive lens elements in the various embodiments may be composed of plastic materials. In some embodiments, the refractive lens elements may be composed of injection molded optical plastic materials. However, other suitable transparent materials may be used. Also note that, in a given embodiment, different ones of the lens elements may be composed of materials with different optical characteristics, for example different Abbe numbers and/or different refractive indices.

In embodiments of the compact lens system, the lens element materials may be selected and the refractive power distribution of the lens elements may be calculated to satisfy a lens system effective focal length and F-number requirement and to correct for lens artifacts and effects including one or more of but not limited to vignetting, chromatic aberrations, lens flare, and the field curvature or Petzval sum. For example, monochromatic and chromatic variations of optical aberrations may be reduced by adjusting the radii of curvature and aspheric coefficients or geometrical shapes of the lens elements and axial separations to produce well-corrected and balanced minimal residual aberrations, as well as to reduce the total track length (TTL) and to achieve quality optical performance and high image resolution in a small form factor narrow angle camera.

Figure 1:
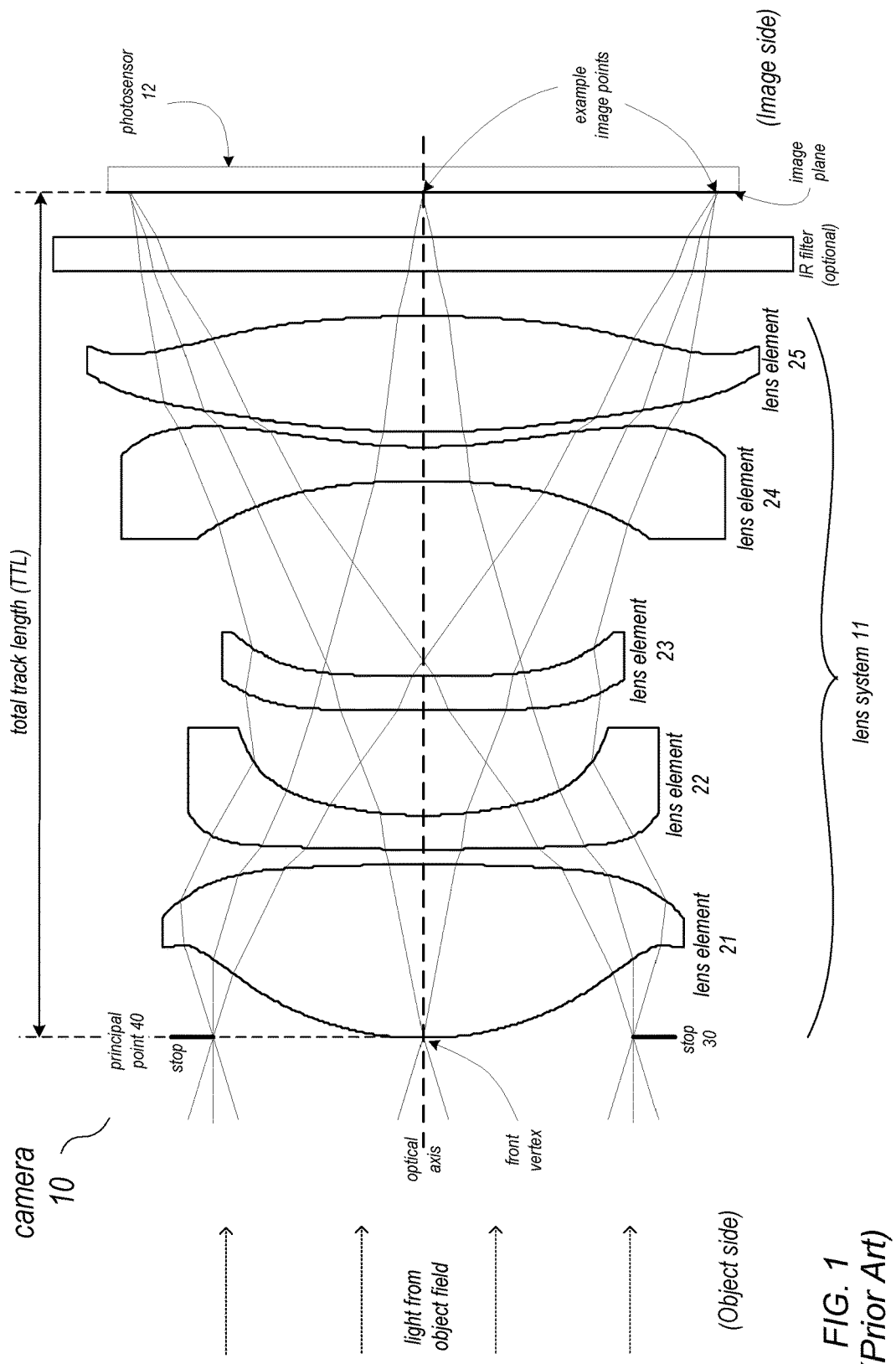
FIG. 1 is a cross-sectional illustration of a prior art compact camera including a compact lens system that includes five lens elements and an aperture stop at or in front of the front vertex of the lens system.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ". Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Embodiments of a small form factor camera including a photosensor and a compact lens system are described. Various embodiments of a compact, narrow angle lens system including six lens elements are described that may be used in the camera and that provide a lower F-number and shorter total track length than has been realized in conventional compact cameras. The camera may be implemented in a small package size while still capturing sharp, high-resolution images, making embodiments of the camera suitable for use in small and/or mobile multipurpose devices such as cell phones, smartphones, pad or tablet computing devices, laptop, netbook, notebook, subnotebook, and ultrabook computers, and so on. However, note that aspects of the camera (e.g., the lens system and photosensor) may be scaled up or down to provide cameras with larger or smaller package sizes. In addition, embodiments of the camera system may be implemented as stand-alone digital cameras. In addition to still (single frame capture) camera applications, embodiments of the camera system may be adapted for use in video camera applications.

FIG. 1 is a cross-sectional illustration of an example compact camera including a compact narrow angle lens system that includes five lens elements and an aperture stop at or in front of the front vertex of the lens system. A camera 10 includes at least a compact narrow-angle lens system 11 and a photosensor 12. The camera 10 may include an aperture stop 30 at or in front of the front vertex of the lens system 11. The camera 10 may also include an infrared (IR) filter located between the lens system 11 and the photosensor 12. The compact lens system 11 of camera 10 may include five lens elements (21-25) with refractive power and lens system effective focal length f, arranged along an optical axis in order from an object side to an image side:

a first lens element 21 with positive refractive power;
a second lens element 22 with negative refractive power;
a third lens element 23 with negative refractive power;
a fourth lens element 24 with negative refractive power; and
a fifth lens element 25 with positive refractive power.

The narrow-angle, five lens element lens system 11 of FIG. 1 may provide an F-number (focal ratio) of 2.8 or higher. The F-number or focal ratio of a lens system is the ratio (f/D) of the lens system's focal length (f) to the diameter of the entrance pupil (D) of the aperture stop. To achieve lower F-numbers with camera 10, the aperture of the camera 10 needs to be enlarged. However, with a larger aperture, the five lens element lens system 11 would need to be stronger (in optical power) to avoid imaging quality degradation and to achieve satisfactory performance. With the five lens element lens system 11 as shown in FIG. 1, the total track length (TTL) of the lens system 11 would need to be increased to increase the strength of the lens system 11. (TTL of a lens system is the distance from the front vertex of the lens system to the image plane at the surface of the sensor). However, increasing the TTL of the lens system 11 increases the package size of the lens system 11, and may require the camera 10 to be larger. In addition, with the aperture stop 30 at the front vertex of the lens system 11 as shown in FIG. 1, the principal point 40 of the camera 10 is effectively at the stop 30.

Embodiments of compact narrow angle lens systems with six lens elements are described. Embodiments may provide a larger aperture and thus lower F-numbers when compared to five lens element lens systems. Embodiments of the compact narrow angle lens systems with six lens elements as described herein may provide higher imaging quality at lower F-numbers (e.g., at or below 2.8, for example 2.6 or 2.4) than can be achieved with five lens element lens systems as shown in FIG. 1, while providing the same or similar TTL and thus the same or similar package size. The six lens elements of the lens system provide increased optical power when compared to the five-lens system 11 as illustrated in FIG. 1 to achieve satisfactory performance with the larger aperture and lower F-numbers without increasing TTL and package size of the compact lens system.

Figure 2:
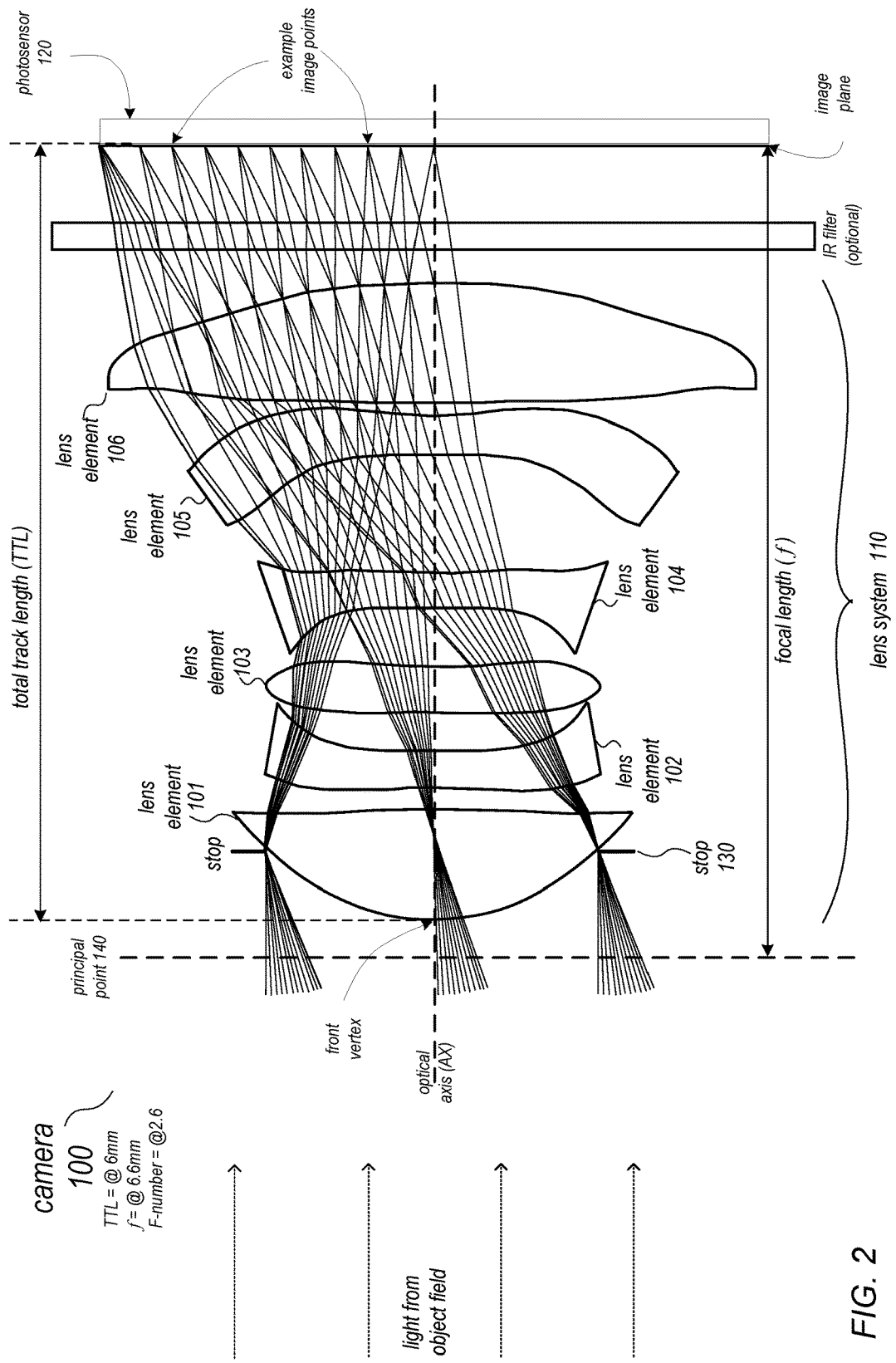
FIG. 2 is a cross-sectional illustration of an example embodiment of a compact camera including a compact lens system that includes six lens elements in which the aperture stop is located at the first lens element and behind the front vertex of the lens system.
Figure 3:
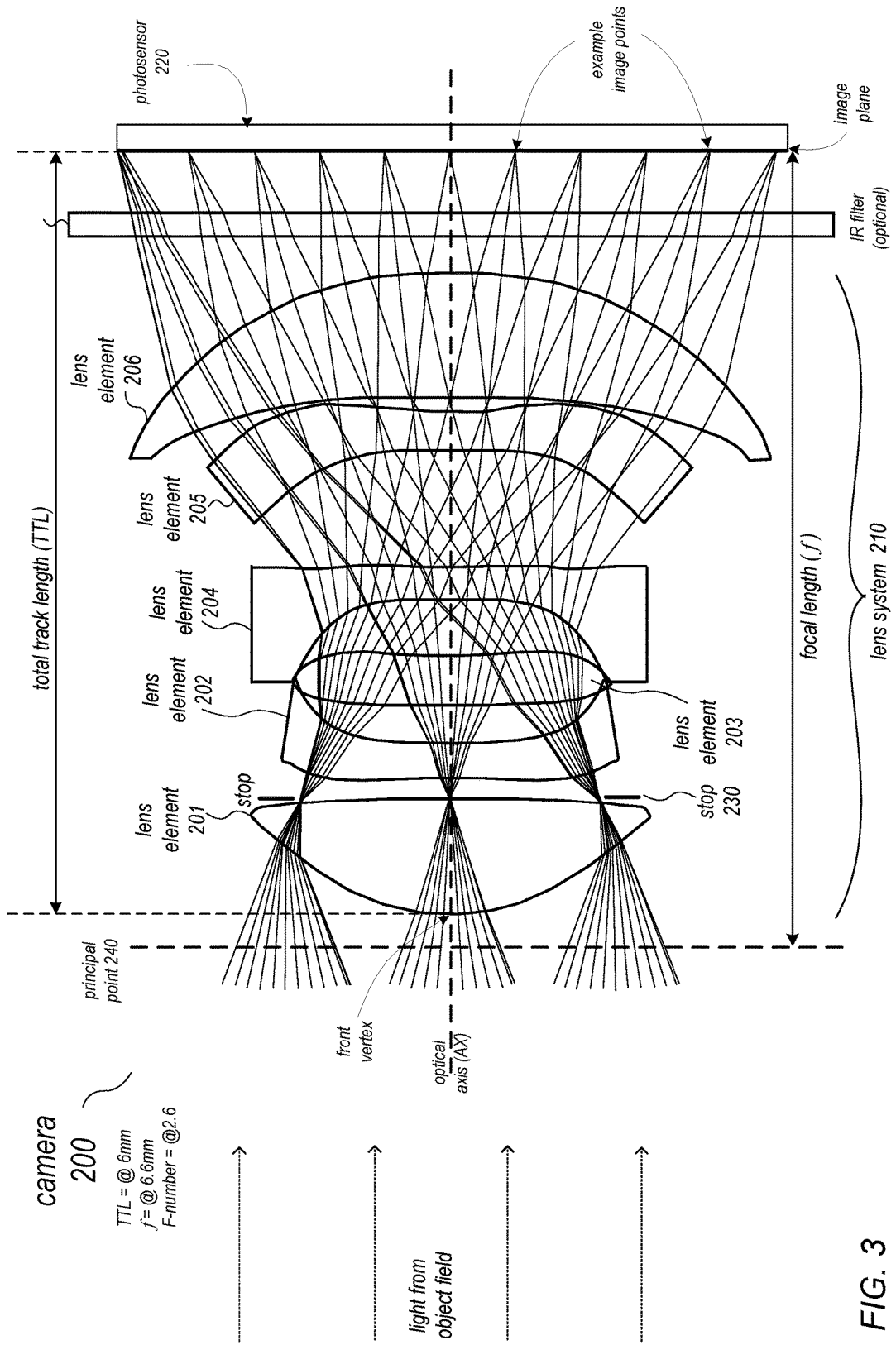
FIG. 3 is a cross-sectional illustration of an example embodiment of a compact camera including a compact lens system that includes six lens elements with refractive power in which the aperture stop is located between the first and second lens elements.
Figure 4:
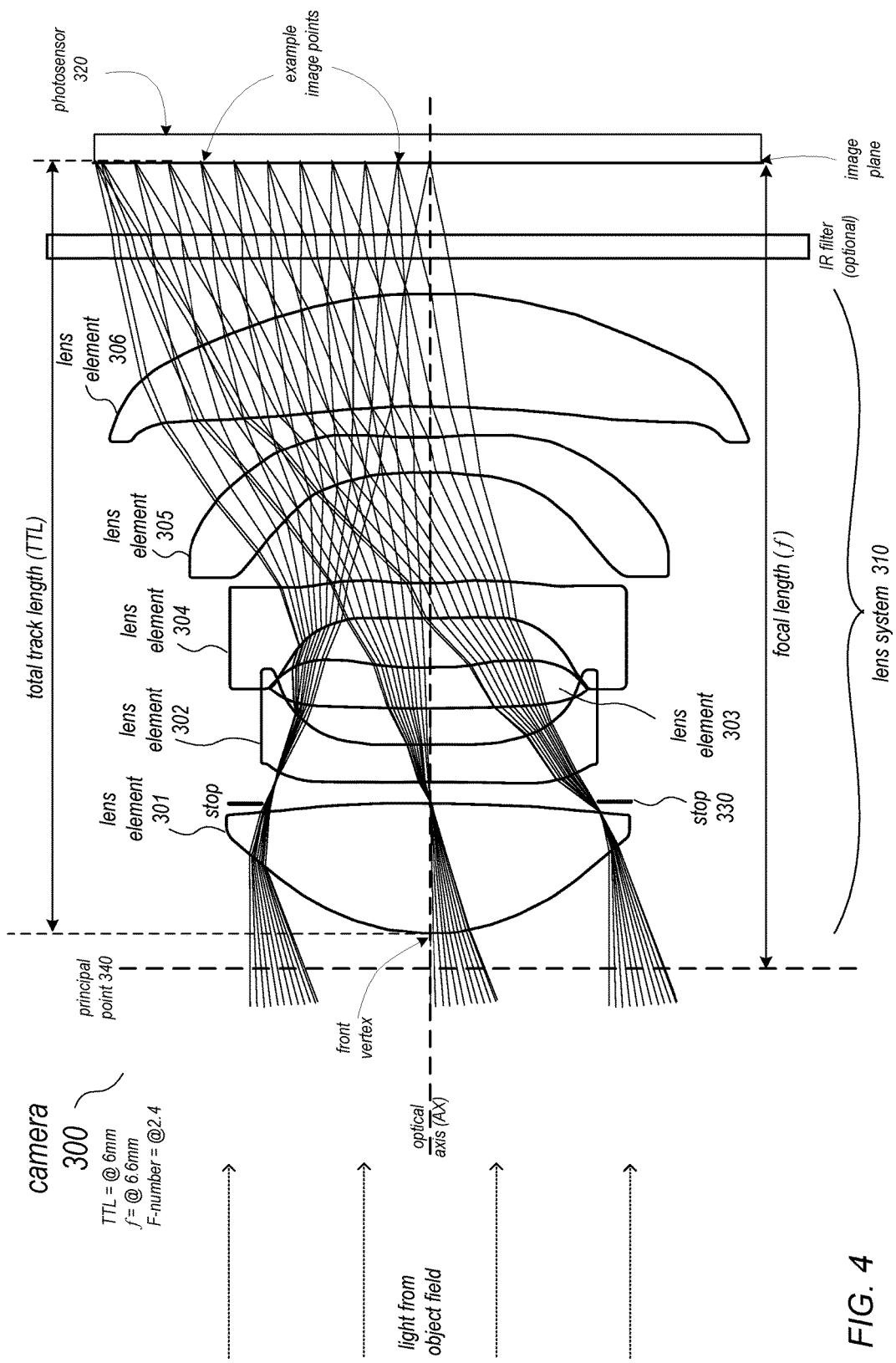
FIG. 4 is a cross-sectional illustration of another example embodiment of a compact camera including a compact lens system that includes six lens elements with refractive power in which the aperture stop is located between the first and second lens elements.

In addition to the addition of a sixth lens element to the lens system, the power order of the lenses in the six lens element lens system may be different than the power order of the lenses in the five lens element lens system 11. For example, in the example five lens element lens system 11 of FIG. 1, the power order, from the first lens to the fifth lens, is PNNNP where P indicates a lens with positive refractive power, and N represents a lens with negative refractive power. The power order in an example six lens element lens system as shown in FIGS. 2 through 4 may be PNPNNP. Note, however, that other power orders are possible and contemplated, for example PNPNPP or PNNNPP. In addition, in some embodiments, the location of the aperture stop may be moved behind the front vertex of the lens system, for example behind the front vertex at the first lens element or between the first and second lens elements. Moving the aperture stop inwards (towards the image side) effectively moves the ideal principal point of the camera forwards, to the object side and in front of the front vertex of the lens system.

In addition, lens system parameters including but not limited to lens shape, geometry, position, and materials may be selected at least in part to reduce, compensate, or correct for lens artifacts and effects including one or more of but not limited to vignetting, chromatic aberration, the field curvature or Petzval sum, and lens flare. For example, in some embodiments, lens system parameters of one or more of the lens elements may be selected to adjust the light rays passing through the lens system to reduce or eliminate lens flare. Thus, the six lens element lens system may reduce lens flare to produce less lens flare effect in captured images than is typically present in images captured with a five lens element lens system as illustrated in FIG. 1.

Several non-limiting example embodiments of compact narrow angle lens systems with six lens elements are described. FIG. 2 shows an example embodiment that includes six refracting lens elements in which the aperture stop is located at the first lens element and behind the front vertex of the lens system. FIGS. 3 and 4 show example embodiments that include six refracting lens elements in which the aperture stop is located between the first and second lens elements. The example embodiments of compact narrow angle lens systems with six lens elements as described herein may provide f-numbers that are less than 2.8, for example 2.6, 2.4, or lower, with focal length (f) of about 6.6 mm, and a TTL of about 5.9 to 6 mm. Note, however, that these examples are not intended to be limiting, and that variations on the various parameters given for the lens systems are possible while still achieving similar results.

The refractive lens elements in the various embodiments may, for example, be composed of a plastic material. In some embodiments, the refractive lens elements may be composed of an injection molded plastic material. However, other transparent materials may be used. Also note that, in a given embodiment, different ones of the lens elements may be composed of materials with different optical characteristics, for example different Abbe numbers and/or different refractive indices. The Abbe number, $V_d$, may be defined by the equation:

$$V_d = (N_d - 1)(N_F - N_C),$$

where $N_F$ and $N_C$ are the refractive index values of the material at the F and C lines of hydrogen, respectively.

Small Form Factor Cameras with Low F-Number Narrow Angle Lens Systems

In each of FIGS. 2 through 4, an example camera includes at least a compact narrow-angle lens system and a photosensor. The photosensor may be an integrated circuit (IC) technology chip or chips implemented according to any of various types of photosensor technology. Examples of photosensor technology that may be used are charge-coupled device (CCD) technology and complementary metal-oxide-semiconductor (CMOS) technology. In some embodiments, pixel size of the photosensor may be 1.2 microns or less, although larger pixel sizes may be used. In a non-limiting example embodiment, the photosensor may be manufactured according to a 1280×720 pixel image format to capture 1 megapixel images. However, other pixel formats may be used in embodiments, for example 5 megapixel, 10 megapixel, or larger or smaller formats.

The camera may also include an aperture stop (AS) located at the first lens element and behind the front vertex of the lens system as shown in FIG. 2, or between the first and second lens elements as shown in FIGS. 3 and 4.

The camera may also, but does not necessarily, include an infrared (IR) filter located between the last or sixth lens element of the lens system and the photosensor. The IR filter may, for example, be composed of a glass material. However, other materials may be used. In some embodiments, the IR filter does not have refractive power, and does not affect the effective focal length f of the lens system. Further note that the camera may also include other components than those illustrated and described herein.

In the camera, the lens system forms an image at an image plane (IP) at or near the surface of the photosensor. The image size for a distant object is directly proportional to the effective focal length f of a lens system. The total track length (TTL) of the lens system is the distance on the optical axis (AX) between the front vertex at the object side surface of the first (object side) lens element and the image plane. For a telephoto lens system, the total track length (TTL) is less than the lens system effective focal length (f), and the ratio of total track length to focal length (TTL/f) is the telephoto ratio. To be classified as a telephoto lens system, TTL/f is less than or equal to 1. For a non-telephoto lens system, the telephoto ratio is greater than 1.

In some embodiments, the lens system may be a fixed lens system configured such that the effective focal length f of the lens system is at or about 6.6 millimeters (mm) (e.g., within a range of 6.0-7.0 mm), the F-number (focal ratio, or f/#) is within a range from about 2.2 to about 2.8, the field of view (FOV) is at or about 36 degrees (although narrower or wider FOVs may be achieved), and the total track length (TTL) of the lens system is within a range of about 5.5 to about 6.5 mm.

In the non-limiting example embodiments described herein (see FIGS. 2 through 4), the lens system may be configured such that the effective focal length f of the lens system is at or about 6.6 mm. The non-limiting example embodiments shown in FIGS. 2 and 3 may be configured such that the F-number is at or about 2.6. The non-limiting example embodiment shown in FIG. 4 may be configured such that the F-number is at or about 2.4. The lens system may, for example, be configured with a focal length f of 6.6 mm, TTL of 6 mm, and F-number of 2.4 or 2.6 as shown in the examples to satisfy specified optical, imaging, and/or packaging constraints for particular camera system applications. Note that the F-number, also referred to as the focal ratio or f/#, is defined by f/D, where D is the diameter of the entrance pupil, i.e. the effective aperture. As an example, at f=6.6 mm, an F-number of 2.6 is achieved with an effective aperture of @2.54 mm. As another example, at f=6.6 mm, an F-number of 2.4 is achieved with an effective aperture of @2.75 mm. The example embodiment may, for example, be configured with a field of view (FOV) at or about 36 degrees. Total track length (TTL) of the example embodiments may be at or about 5.9 mm or 6 mm. Telephoto ratio (TTL/f) of the example embodiments is thus about 0.89-0.91.

However, note that the focal length f, F-number, TTL, aperture stop location, and/or other parameters may be scaled or adjusted to meet various specifications of optical, imaging, and/or packaging constraints for other camera system applications. Constraints for a camera system that may be specified as requirements for particular camera system applications and/or that may be varied for different camera system applications include but are not limited to the focal length f, effective aperture, aperture stop location, F-number, field of view (FOV), telephoto ratio, imaging performance requirements, and packaging volume or size constraints.

In some embodiments, the lens system may be adjustable. For example, in some embodiments, a lens system as described herein may be equipped with an adjustable iris (entrance pupil) or aperture stop. Using an adjustable aperture stop, the F-number (focal ratio, or f/#) may be dynamically varied within a range. For example, if the lens system is well corrected at f/2.6, at a given focal length f and FOV, then the focal ratio may be varied within the range of 2.4 to 10 (or higher) by adjusting the aperture stop assuming that the aperture stop can be adjusted to the F-number setting. In some embodiments, the lens system may be used at faster focal ratios (<2.4) by adjusting the aperture stop at the same FOV (e.g. 36 degrees), possibly with degraded imaging quality performance, or with reasonably good performance at a smaller FOV.

While ranges of values may be given herein as examples for adjustable cameras and lens systems in which one or more optical parameters may be dynamically varied (e.g., using an adjustable aperture stop), embodiments of camera systems that include fixed (non-adjustable) lens systems in which values for optical and other parameters are within these ranges may be implemented.

Referring first to embodiments as illustrated in FIG. 1, an example camera 100 includes at least a compact narrow-angle lens system 110 and a photosensor 120. The camera 100 may include an aperture stop 130 at the first lens element and behind the front vertex of the lens system 110. The camera 100 may also, but does not necessarily, include an infrared (IR) filter, for example located between the lens system 110 and the photosensor 120. The IR filter may act to block infrared radiation that could damage or adversely affect the photosensor, and may be configured so as to have no effect on f.

A compact lens system 110 of a camera 100 may include six lens elements (101-106 in lens system 110 of FIG. 1) with refractive power and lens system effective focal length f, arranged along an optical axis AX in order from an object side to an image side:
 a first lens element L1 (101) with positive refractive power having a convex object side surface;
 a second lens element L2 (102) with negative refractive power having a concave image side surface;
 a third lens element L3 (103) with positive refractive power;
 a fourth lens element L4 (104) with negative refractive power having a concave object side surface;
 a fifth lens element L5 (105) with negative refractive power having a concave object side surface; and
 a sixth lens element L6 (106) with positive refractive power having a convex image side surface.

In addition, at least one of the object side and image side surfaces of the six lens elements may be aspheric.

In some embodiments of lens system 110, L1, L3, and/or L6 may be biconvex in shape. In some embodiments of lens system 110, L2, L4, and/or L5 may be negative meniscus lenses or biconcave lenses. However, other lens shapes may be used in lens system 110. For example, L1 may be a convex lens with a substantially flat image side surface. As another example, L4 may be a concave lens with a substantially flat image side surface. In addition, lenses with other powers may be used. For example, L3 may have negative refractive power, and/or L5 may have positive refractive power. In some embodiments, L3 and/or L5 have low refractive power.

In some embodiments as illustrated in FIG. 2, one or more lens elements may be composed of a material (e.g., a plastic material) having an Abbe number of V1. One or more other lens elements may be composed of a material (e.g., a plastic material) having an Abbe number of V2. In some embodiments, the Abbe numbers of the lens materials for the lens elements may satisfy the condition, $$30 < V1 - V2 < 35.$$

In the camera 100 of FIG. 2, the aperture stop 130 is located at the first lens element 101 and behind the front vertex of the lens system 110. The ideal principal plane 140 is positioned in front of the front vertex of the lens system 110, for example about 0.6 mm in front of the front vertex. The lens system 110 may have an effective focal length f of about 6.6 mm, a TTL of about 6 mm, and an effective aperture of about 2.54 mm. The F-number of the camera 100 is thus about 2.6.

Referring now to embodiments as illustrated in FIG. 3, an example camera 200 includes at least a compact narrow-angle lens system 210 and a photosensor 220. The camera 200 may include an aperture stop 230 located between the first lens element and the second lens element of the lens system 210. The camera 200 may also, but does not necessarily, include an infrared (IR) filter, for example located between the lens system 210 and the photosensor 220. The IR filter may act to block infrared radiation that could damage or adversely affect the photosensor, and may be configured so as to have no effect on f.

A compact lens system 210 of a camera 200 may include six lens elements (201-206) with refractive power and lens system effective focal length f, arranged along an optical axis AX in order from an object side to an image side:
 a first lens element L1 (201) with positive refractive power having a convex object side surface;
 a second lens element L2 (202) with negative refractive power having a concave image side surface;
 a third lens element L3 (203) with positive refractive power;
 a fourth lens element L4 (204) with negative refractive power having a concave object side surface;
 a fifth lens element L5 (205) with negative refractive power having a concave object side surface; and
 a sixth lens element L6 (206) with positive refractive power having a convex image side surface.

In addition, at least one of the object side and image side surfaces of the six lens elements may be aspheric.

In some embodiments of lens system 210, L1 and L3 may be biconvex in shape. In some embodiments of lens system 210, L2, L4, and/or L5 may be negative meniscus lenses or biconcave lenses. In some embodiments of lens system 210, L6 may be a positive meniscus lens. However, other lens shapes may be used in lens system 210. For example, L1 may be a convex lens with a substantially flat image side surface. As another example, L4 may be a concave lens with a substantially flat image side surface. In addition, lenses with other powers may be used. For example, L3 may have negative refractive power, and/or L5 may have positive refracting power. In some embodiments, L3 and/or L5 have low refractive power.

In some embodiments as illustrated in FIG. 3, one or more lens elements may be composed of a material (e.g., a plastic material) having an Abbe number of V1. One or more other lens elements may be composed of a material (e.g., a plastic material) having an Abbe number of V2. In some embodiments, the Abbe numbers of the lens materials for the lens elements may satisfy the condition, $$30 < V1-V2 < 35.$$

In the camera 200 of FIG. 3, the aperture stop 230 is located between the first lens element 201 and the second lens element 201 of the lens system 210. The ideal principal plane 240 is positioned in front of the front vertex of the lens system 210, for example about 0.6 mm in front of the front vertex. The lens system 210 may have an effective focal length f of about 6.6 mm, a TTL of about 6 mm, and an effective aperture of about 2.54 mm. The F-number of the camera 200 is thus about 2.6.

Referring now to embodiments as illustrated in FIG. 4, an example camera 300 includes at least a compact narrow-angle lens system 310 and a photosensor 320. The camera 300 may include an aperture stop 330 located between the first lens element and the second lens element of the lens system 310. The camera 300 may also, but does not necessarily, include an infrared (IR) filter, for example located between the lens system 310 and the photosensor 320. The IR filter may act to block infrared radiation that could damage or adversely affect the photosensor, and may be configured so as to have no effect on f.

A compact lens system 310 of a camera 300 may include six lens elements (301-306) with refractive power and lens system effective focal length f, arranged along an optical axis AX in order from an object side to an image side:
 a first lens element L1 (301) with positive refractive power having a convex object side surface;
 a second lens element L2 (302) with negative refractive power having a concave image side surface;
 a third lens element L3 (303) with positive refractive power;
 a fourth lens element L4 (304) with negative refractive power having a concave object side surface;
 a fifth lens element L5 (305) with negative refractive power having a concave object side surface; and
 a sixth lens element L6 (306) with positive refractive power having a convex image side surface.

In addition, at least one of the object side and image side surfaces of the six lens elements may be aspheric.

In some embodiments of lens system 310, L1 and L3 may be biconvex in shape. In some embodiments of lens system 310, L2, L4, and/or L5 may be negative meniscus lenses or biconcave lenses. In some embodiments of lens system 310, L6 may be a positive meniscus lens. However, other lens shapes may be used in lens system 310. For example, L1 may be a convex lens with a substantially flat image side surface. As another example, L4 may be a concave lens with a substantially flat image side surface. In addition, lenses with other powers may be used. For example, L3 may have negative refractive power, and/or L5 may have positive refracting power. In some embodiments, L3 and/or L5 have low refractive power.

In some embodiments as illustrated in FIG. 4, one or more lens elements may be composed of a material (e.g., a plastic material) having an Abbe number of V1. One or more other lens elements may be composed of a material (e.g., a plastic material) having an Abbe number of V2. In some embodiments, the Abbe numbers of the lens materials for the lens elements may satisfy the condition, $$30 < V1-V2 < 35.$$

In the camera 300 of FIG. 4, the aperture stop 330 is located between the first lens element 301 and the second lens element 301 of the lens system 310. The ideal principal plane 340 is positioned in front of the front vertex of the lens system 310, for example about 0.6 mm in front of the front vertex. The lens system 310 may have an effective focal length f of about 6.6 mm, a TTL of about 6 mm, and an effective aperture of about 2.75 mm. The F-number of the camera 300 is thus about 2.4.

Figure 5:
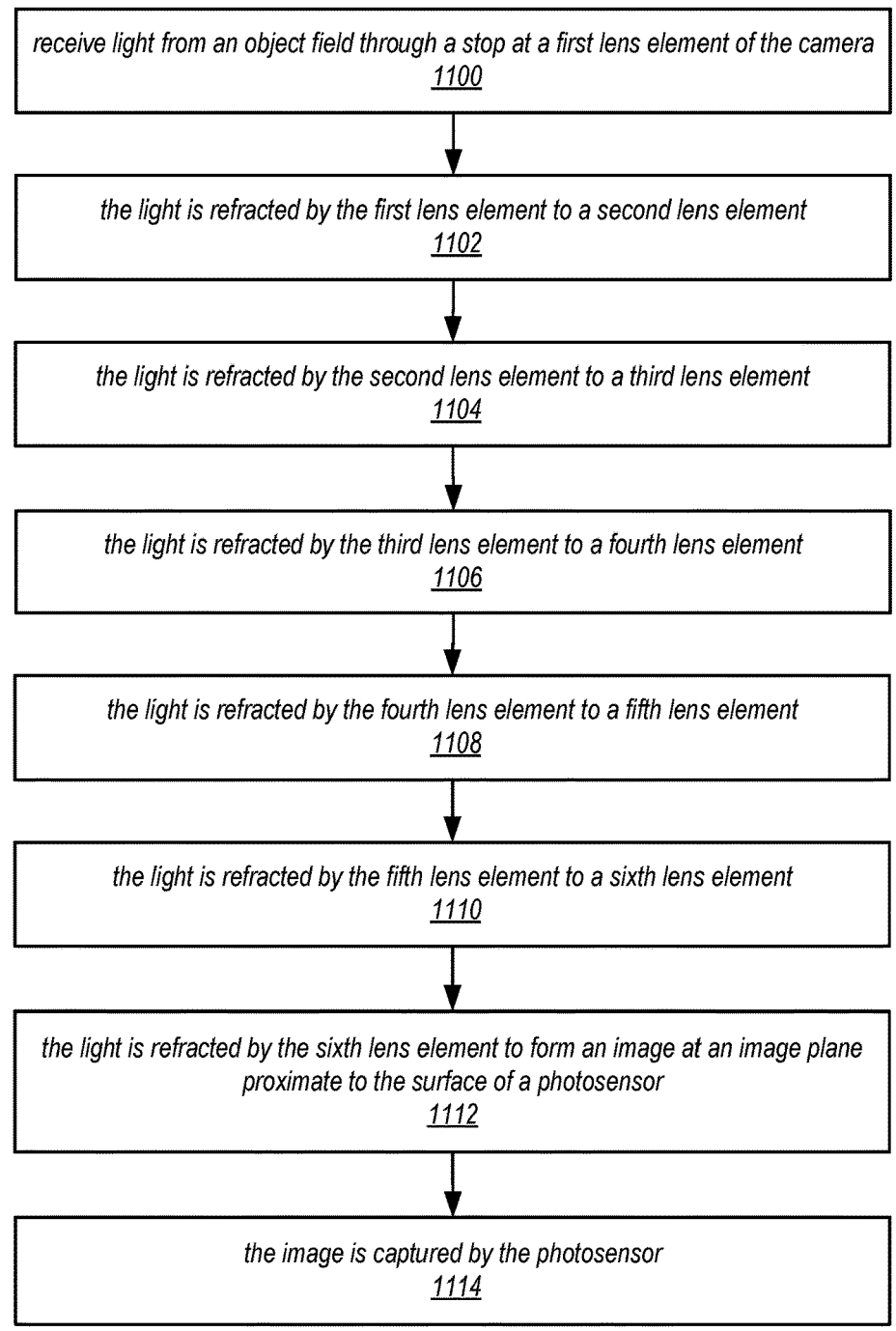
FIG. 5 is a flowchart of a method for capturing images using a camera as illustrated in FIG. 2, according to some embodiments.

FIG. 5 is a high-level flowchart of a method for capturing images using a camera with a lens system that includes six lens elements and an aperture stop at the first lens element and behind the front vertex of the lens system as illustrated in FIGS. 2 and 3, according to some embodiments. As indicated at 1100, light from an object field in front of the camera is received at a first lens element of the camera through an aperture stop. In some embodiments, the aperture stop may be located at the first lens element and behind the front vertex of the lens system. As indicated at 1102, the first lens element refracts the light to a second lens element. In some embodiments, the first lens element may have positive refracting power. As indicated at 1104, the light is then refracted by the second lens element to a third lens element. In some embodiments, the second lens element may have negative refracting power. As indicated at 1106, the light is then refracted by the third lens element to a fourth lens element. In some embodiments, the third lens element may have positive refracting power. As indicated at 1108, the light is then refracted by the fourth lens element to a fifth lens element. In some embodiments, the fourth lens element may have negative refracting power. As indicated at 1110, the light is then refracted by the fifth lens element to a sixth lens element. In some embodiments, the fifth lens element may have negative refracting power. As indicated at 1112, the light is refracted by the sixth lens element to form an image at an image plane at or near the surface of a photosensor. In some embodiments, the sixth lens element may have positive refracting power. As indicated at 1114, the image is captured by the photosensor. While not shown, in some embodiments, the light may pass through an infrared filter that may for example be located between the sixth lens element and the photosensor.

In some embodiments, the six lens elements referred to in FIG. 5 may be configured as illustrated in FIG. 2. Alternatively, the six lens elements may be configured as illustrated in FIG. 3. However, note that variations on the examples given in FIGS. 2 and 3 are possible while achieving similar optical results.

Figure 6:
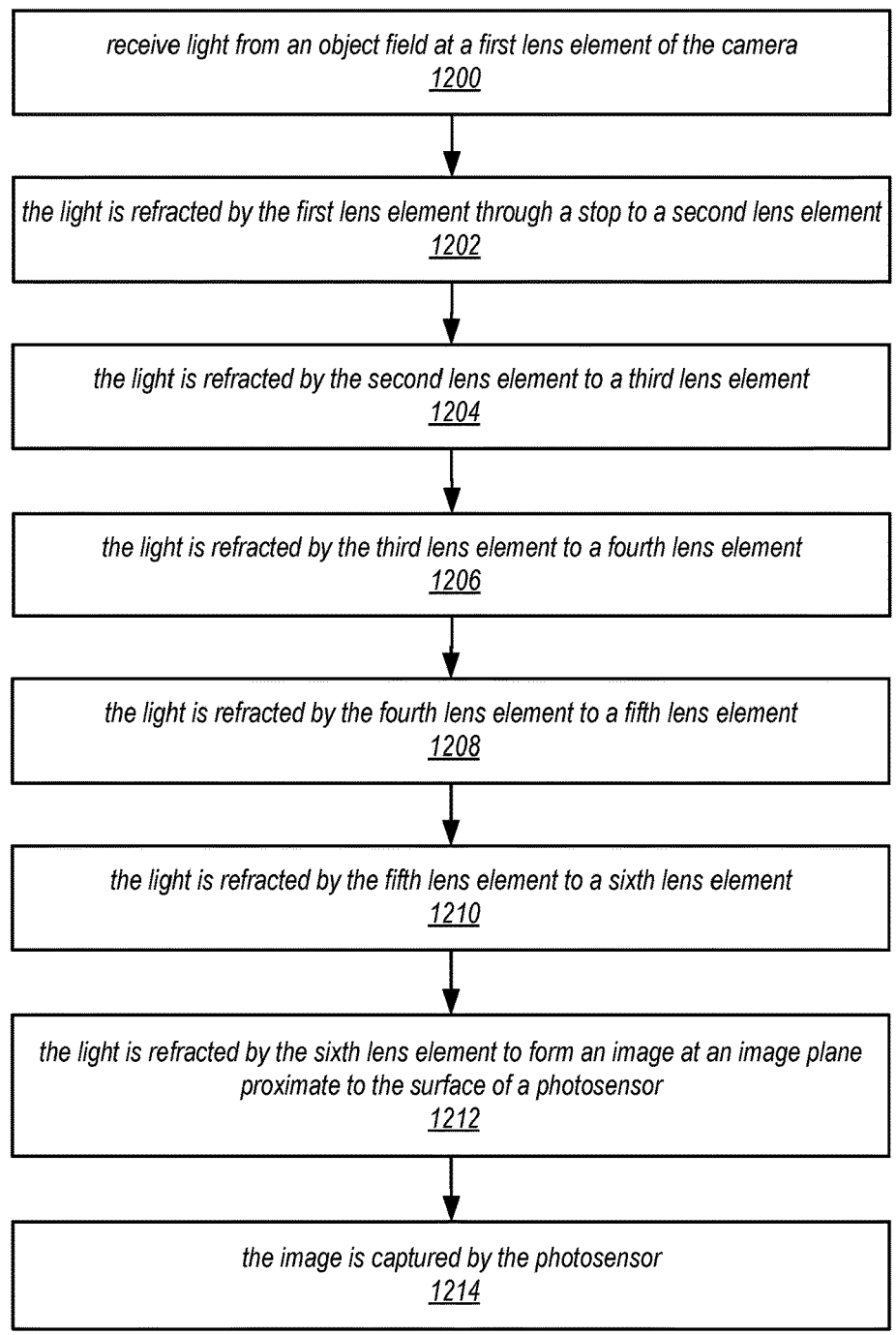
FIG. 6 is a flowchart of a method for capturing images using a camera as illustrated in FIGS. 3 and 4, according to some embodiments.

FIG. 6 is a high-level flowchart of a method for capturing images using a camera with a lens system that includes six lens elements and an aperture stop at the first lens element and behind the front vertex of the lens system as illustrated in FIG. 4, according to some embodiments. As indicated at 1200, light from an object field in front of the camera is received at a first lens element of the camera. As indicated at 1202, the first lens element refracts the light through an aperture stop to a second lens element. In some embodiments, the aperture stop may be located between the first lens element and the second lens element of the lens system. In some embodiments, the first lens element may have positive refracting power. As indicated at 1204, the light is then refracted by the second lens element to a third lens element. In some embodiments, the second lens element may have negative refracting power. As indicated at 1206, the light is then refracted by the third lens element to a fourth lens element. In some embodiments, the third lens element may have positive refracting power. As indicated at 1208, the light is then refracted by the fourth lens element to a fifth lens element. In some embodiments, the fourth lens element may have negative refracting power. As indicated at 1210, the light is then refracted by the fifth lens element to a sixth lens element. In some embodiments, the fifth lens element may have negative refracting power. As indicated at 1212, the light is refracted by the sixth lens element to form an image at an image plane at or near the surface of a photosensor. In some embodiments, the sixth lens element may have positive refracting power. As indicated at 1214, the image is captured by the photosensor. While not shown, in some embodiments, the light may pass through an infrared filter that may for example be located between the sixth lens element and the photosensor.

In some embodiments, the six lens elements referred to in FIG. 6 may be configured as illustrated in FIG. 4. However, note that variations on the example given in FIG. 4 are possible while achieving similar optical results.

Example Computing Device

Figure 7:
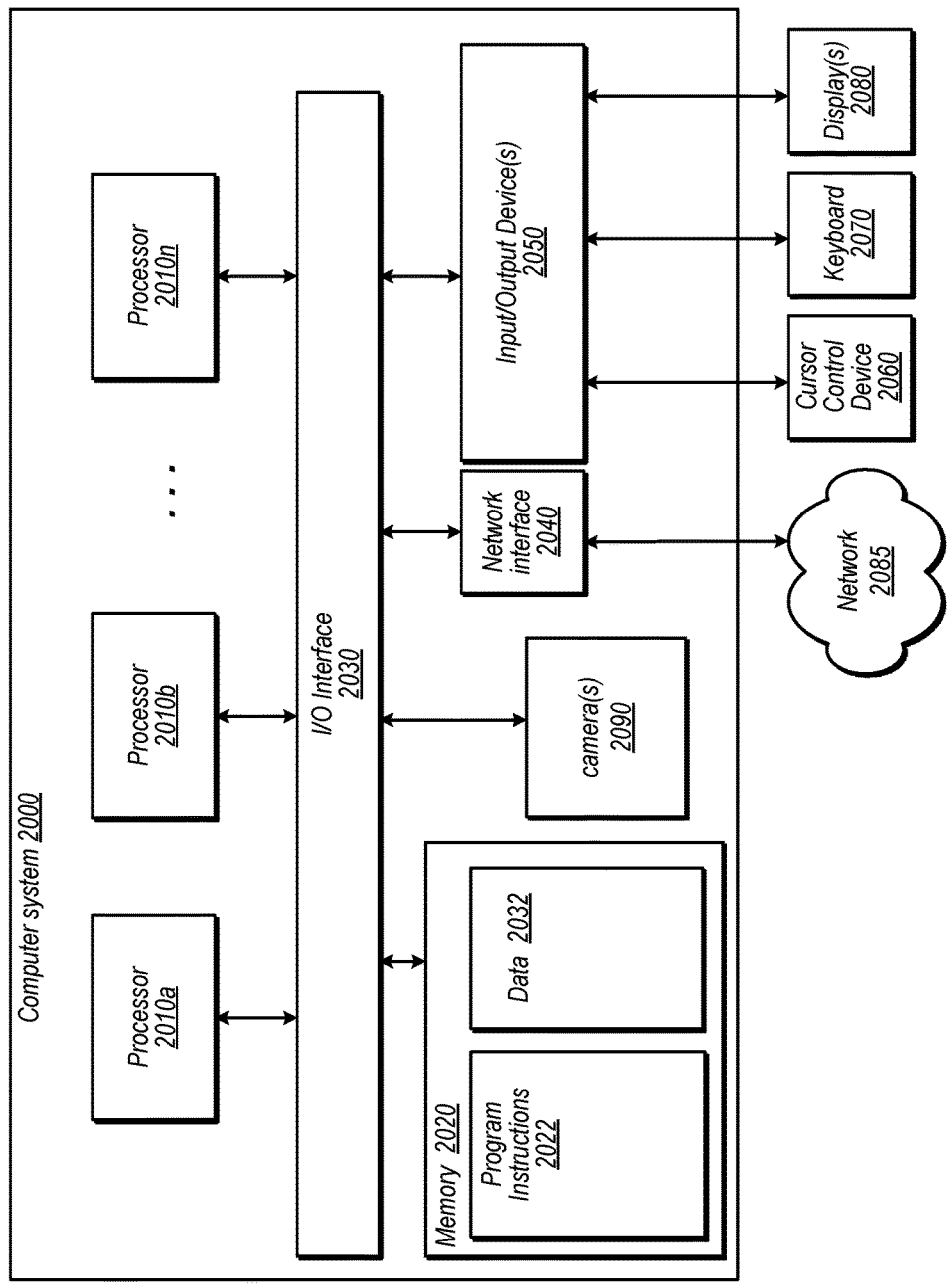
FIG. 7 illustrates an example computer system that may be used in embodiments.

FIG. 7 illustrates an example computing device, referred to as computer system 2000, that may include or host embodiments of the camera as illustrated in FIGS. 2 through 6. In addition, computer system 2000 may implement methods for controlling operations of the camera and/or for performing image processing of images captured with the camera. In different embodiments, computer system 2000 may be any of various types of devices, including, but not limited to, a personal computer system, desktop computer, laptop, notebook, tablet or pad device, slate, or netbook computer, mainframe computer system, handheld computer, workstation, network computer, a camera, a set top box, a mobile device, a wireless phone, a smartphone, a consumer device, video game console, handheld video game device, application server, storage device, a television, a video recording device, a peripheral device such as a switch, modem, router, or in general any type of computing or electronic device.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030, and one or more input/output devices 2050, such as cursor control device 2060, keyboard 2070, and display(s) 2080. Computer system 2000 may also include one or more cameras 2090, for example one or more cameras as described above with respect to FIGS. 2 through 6, which may also be coupled to I/O interface 2030, or one or more cameras as described above with respect to FIGS. 2 through 6 along with one or more other cameras such as conventional wide-field cameras.

In various embodiments, computer system 2000 may be a uniprocessor system including one processor 2010, or a multiprocessor system including several processors 2010 (e.g., two, four, eight, or another suitable number). Processors 2010 may be any suitable processor capable of executing instructions. For example, in various embodiments processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

System memory 2020 may be configured to store program instructions 2022 and/or data 2032 accessible by processor 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions 2022 may be configured to implement various interfaces, methods and/or data for controlling operations of camera 2090 and for capturing and processing images with integrated camera 2090 or other methods or data, for example interfaces and methods for capturing, displaying, processing, and storing images captured with camera 2090. In some embodiments, program instructions and/or data may be received, sent or stored upon different types of computer-accessible media or on similar media separate from system memory 2020 or computer system 2000.

In one embodiment, I/O interface 2030 may be configured to coordinate I/O traffic between processor 2010, system memory 2020, and any peripheral devices in the device, including network interface 2040 or other peripheral interfaces, such as input/output devices 2050. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments some or all of the functionality of I/O interface 2030, such as an interface to system memory 2020, may be incorporated directly into processor 2010.

Network interface 2040 may be configured to allow data to be exchanged between computer system 2000 and other devices attached to a network 2085 (e.g., carrier or agent devices) or between nodes of computer system 2000. Network 2085 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 2040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2050 may, in some embodiments, include one or more display terminals, keyboards, keypads, touchpads, scanning devices, voice or optical recognition devices, or any other devices suitable for entering or accessing data by computer system 2000. Multiple input/output devices 2050 may be present in computer system 2000 or may be distributed on various nodes of computer system 2000. In some embodiments, similar input/output devices may be separate from computer system 2000 and may interact with one or more nodes of computer system 2000 through a wired or wireless connection, such as over network interface 2040.

As shown in FIG. 17, memory 2020 may include program instructions 2022, which may be processor-executable to implement any element or action to support integrated camera 2090, including but not limited to image processing software and interface software for controlling camera 2090. In some embodiments, images captured by camera 2090 may be stored to memory 2020. In addition, metadata for images captured by camera 2090 may be stored to memory 2020.

Those skilled in the art will appreciate that computer system 2000 is merely illustrative and is not intended to limit the scope of embodiments. In particular, the computer system and devices may include any combination of hardware or software that can perform the indicated functions, including computers, network devices, Internet appliances, PDAs, wireless phones, pagers, video or still cameras, etc. Computer system 2000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system 2000 via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 2000 may be transmitted to computer system 2000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A lens system, comprising:
   a plurality of refractive lens elements arranged along an optical axis of the lens system, wherein the plurality of lens elements includes, in order along the optical axis from an object side to an image side:
   a first lens element with positive refractive power having a convex object side surface;
   a second lens element with negative refractive power having a concave image side surface;
   a third lens element;
   a fourth lens element with negative refractive power;
   a fifth lens element; and
   a sixth lens element with positive refractive power having a convex image side surface;
   wherein the lens system has effective focal length f within a range of 6.0 to 7.0 millimeters, and wherein total track length (TTL) of the lens system is within a range of 5.5 to 6.5 millimeters.

2. The lens system as recited in claim 1, wherein focal ratio of the lens system is 2.8 or less.

3. The lens system as recited in claim 1, wherein the third lens element from the object side of the lens system is a positive lens with positive refractive power, and wherein the fifth lens element from the object side of the lens system is a negative lens with negative refractive power.

4. The lens system as recited in claim 1, wherein the lens system further comprises an aperture stop located at the first lens element from the object side of the lens system and behind a front vertex of the lens system.

5. The lens system as recited in claim 4, wherein effective aperture of the lens system is 2.6 millimeters or less.

6. The lens system as recited in claim 1, wherein the lens system further comprises an aperture stop located between the first lens element and the second lens element of the lens system.

7. The lens system as recited in claim 6, wherein effective aperture of the lens system is 2.8 millimeters or less.

8. The lens system as recited in claim 1, wherein telephoto ratio (TTL/f) of the lens system is less than or equal to 1.0.

9. A lens system, comprising:
   six refractive lens elements arranged along an optical axis and configured to refract light from an object field to form an image of a scene at an image plane; and
   an aperture stop located behind a front vertex of the lens system;
   wherein the lens system has effective focal length f within a range of 6.0 to 7.0 millimeters, wherein total track length (TTL) of the lens system is within a range of 5.5 millimeters to 6.5 millimeters, and wherein focal ratio of the lens system is 2.8 or less; and
   wherein locating the aperture stop behind the front vertex acts to move an ideal principal point of the lens system forward in front of the front vertex of the lens system.

10. The lens system as recited in claim 9, wherein the lens elements include, in order along the optical axis from an object side to an image side:
    a first lens element with positive refractive power having a convex object side surface;
    a second lens element with negative refractive power having a concave image side surface;
    a third lens element;
    a fourth lens element with negative refractive power;
    a fifth lens element; and
    a sixth lens element with positive refractive power having a convex image side surface.

11. The lens system as recited in claim 10, wherein the third lens element from the object side of the lens system is a positive lens with low positive refractive power.

12. The lens system as recited in claim 10, wherein the fifth lens element from the object side of the lens system is a negative lens with negative refractive power.

13. The lens system as recited in claim 10, wherein the second lens element has a concave object side surface, wherein the third lens element has a convex image side surface, and wherein the fourth lens element has a concave image side surface.

14. The lens system as recited in claim 9, wherein effective aperture of the lens system is 2.8 millimeters or less.

15. The lens system as recited in claim 9, wherein at least one surface of at least one of the six refractive lens elements is aspheric.

16. The lens system as recited in claim 9, wherein at least one of the six refractive lens elements is composed of a first plastic material, and wherein at least one other of the six refractive lens elements is composed of a second plastic material with different optical characteristics than the first plastic material.

17. The lens system as recited in claim 9, wherein the lens system has effective focal length f, and wherein telephoto ratio (TTL/f) of the lens system is less than or equal to 1.0.

18. A device, comprising:
    one or more processors;
    one or more cameras; and
    a memory comprising program instructions executable by at least one of the one or more processors to control operations of the one or more cameras;
    wherein at least one of the one or more cameras is a narrow angle camera comprising:
      a photosensor configured to capture light projected onto a surface of the photosensor; and
      a lens system configured to refract light from an object field located in front of the camera to form an image of a scene at an image plane proximate to the surface of the photosensor, wherein the lens system comprises six refractive lens elements arranged along an optical axis of the camera; and
    wherein the lens system has effective focal length f within a range of 6.0 to 7.0 millimeters, wherein total track length (TTL) of the lens system is within a range of 5.5 millimeters to 6.5 millimeters, and wherein focal ratio of the lens system is 2.8 or less.

19. The device as recited in claim 18, wherein the lens system further comprises an aperture stop located behind a front vertex of the lens system, wherein locating the aperture stop behind the front vertex acts to move an ideal principal point of the camera forward in front of the front vertex of the lens system.

* * * * *